WAVE SHAPING CIRCUITS
Filed Sept. 25, 1951

INVENTORS
DAVID D. HOLMES
& THOMAS O. STANLEY
BY
ATTORNEY

United States Patent Office 2,708,717
Patented May 17, 1955

2,708,717

WAVE SHAPING CIRCUITS

David D. Holmes, Princeton, and Thomas O. Stanley, Spring Lake, N. J., assignors to Radio Corporation of America, a corporation of Delaware Application September 25, 1951, Serial No. 248,232

5 Claims. (Cl. 250—27)

This invention relates to electrical wave shaping circuits, and more particularly to wave shaping circuits designed to compress one part of a signal and to expand another part of that signal.

Such wave shaping circuits find some of their applications in the television art. The present invention will be described in connection with one such application.

The light output of the picture tube (or kinescope) of a television receiver usually varies as a function of some power (greater than unity) of the input signal. A typical curve illustrating this relationship can be found at page 237 of "Electron Optics in Television" by I. G. Maloff and D. W. Epstein, first edition, McGraw-Hill, 1938. A given input signal increment will give a greater light output increment in the portions of the input signal representing light area than in those representing dark areas. This characteristic of the kinescope results in poor picture gray scale rendition.

It has been found that the gray scale rendition of a kinescope can be substantially improved by altering the linearity of the signal transfer characteristic of the signal transmission path in order to compensate for the non-linearity of the kinescope characteristics.

Accordingly, one object of this invention is to provide a circuit that will alter the linearity of the signal transfer characteristics of a signal transmission path.

Another object of this invention is to provide a circuit that will compensate for the non-linearity of the signal transfer characteristic of an electrical arrangement. According to the illustrated embodiment of the present invention, compensation for the non-linearity of the signal transfer characteristic of an electrical arrangement is accomplished as follows: An electrical circuit is selected whose signal transfer characteristic matches that of the electrical arrangement. The input signal which is to be shaped is fed through a controlled amplifier to this selected circuit. The instantaneous difference between the input signal and the output signal of the selected circuit is obtained and used to control the signal transfer characteristic of the controlled amplifier.

Other and incidental objects of the present invention will be apparent to those skilled in the art from a reading of the following specification and an inspection of the accompanying drawing in which.

Figure 1:
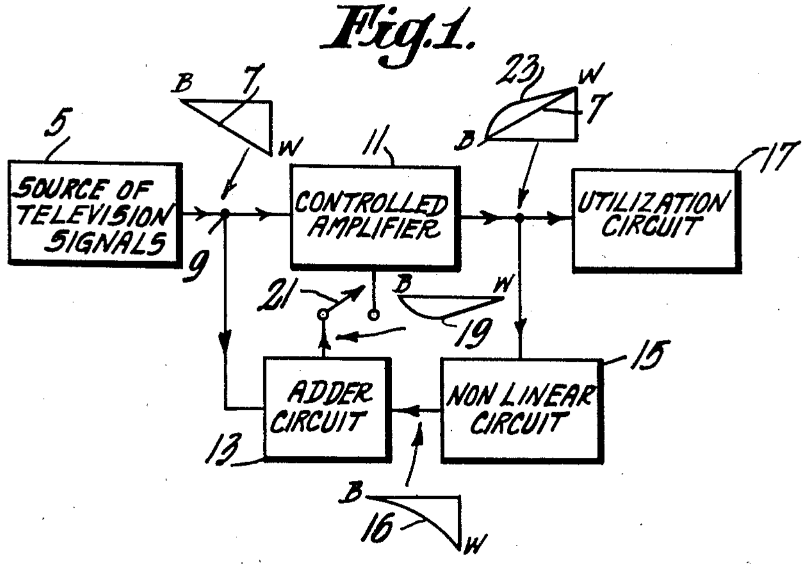
Fig. 1 is a block diagram of apparatus embodying the present invention.

Referring now to Fig. 1, there is shown a signal source 5, which by way of example is shown as a source of television signals. A signal 7, varying linearly from black (B) to white (W), is shown at the output terminal 9 of the signal source 5. The signal 7 is fed to a controlled amplifier 11 and also to an adder circuit 13. The output signal of the controlled amplifier 11 is fed to a circuit 15 having a non-linear transfer characteristic, and to a utilization circuit 17. The signal transfer characteristic of circuit 15 is similar to the signal transfer characteristic of the electrical arrangement for which compensation is desired. The output signal 16 of circuit 15 is fed to the adder circuit. The output signal of the adder circuit 13 is a signal 17 which, when switch 21 is closed, is applied as a control potential to amplifier 11 to change its signal transfer characteristic. The output of amplifier 11 is shown as signal 23.

As used in this specification, the term "adder circuit" means a circuit capable of doing an algebraic addition, and as such comprises circuits capable of adding two signals as well as circuits capable of subtracting two signals. Such circuits are well known in the art, and are discussed, for example, in chapter 18 of "Waveforms," vol. 19 of the M. I. T. Radiation Laboratory Series, McGraw-Hill, 1949.

Let us assume that the signal transfer characteristic of the electrical arrangement for which compensation is desired follows an *n*th power law, and that circuit 15 has the same characteristic. The desired output signal 23 is the *n*th root of the input signal 7. Hence, if a signal $A^n$ is assumed to be the input, the output under ideal conditions is A (*n*th root of $A^n$).

The input signal $A^n$ is fed to amplifier 11 and circuit 15. The output of circuit 15 is compared in adder circuit 11 with the original input signal 7. The output signal 19 of the adder circuit 11 represents the instantaneous difference between signals 7 and 16 when these signals are in phase. When switch 21 is closed, the signal 19 serves to vary the gain of amplifier 11 so that the difference between signals 7 and 16 becomes negligible. The output signal 23 of amplifier 11 is the *n*th root of the input signal, or A. This signal 23 is fed to circuit 15 whose output now becomes the *n*th power of the *n*th root of the input signal or that is to say, the input signal $A^n$.

Figure 2:
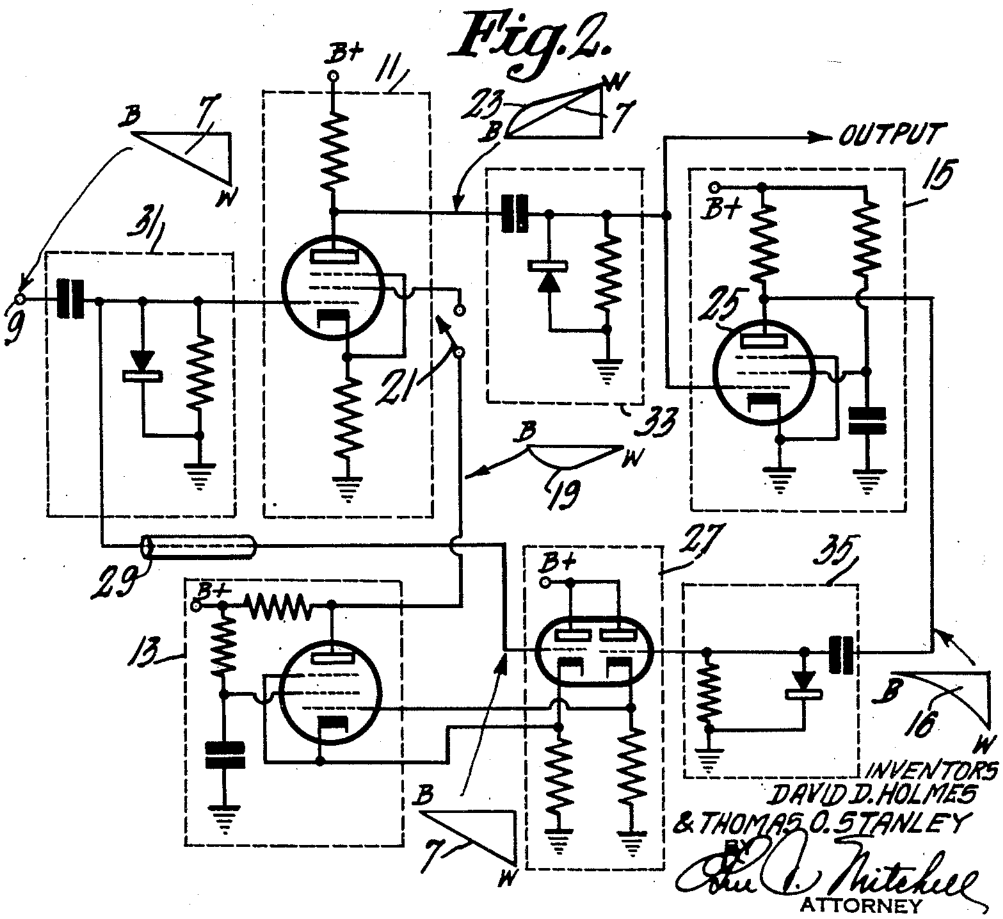
Fig. 2 shows by circuit diagram an embodiment of the present invention.

Fig. 2 shows a circuit capable of performing the operations discussed above. The input signal 7 is fed to the control electrode of amplifier 11. The output of amplifier 11 is fed to the control electrode of amplifier 15. The tube 25 of amplifier 15, in a particular application of the present invention, is selected so that its "plate current versus grid voltage" characteristic matches the "beam current versus grid voltage" characteristic of an average kinescope. The output of amplifier 15 is fed through cathode follower network 27 to an input electrode of adder circuit 13. The input signal 7 is fed through a delay line 29 and cathode follower network 27 to another electrode of adder circuit 13. The delay line 29 is designed to delay signal 7 by the amount it is delayed by going through amplifiers 11 and 15. The cathode follower network 27 gives a low impedance waveform source for the adder circuit 13. Adder circuit 13 is of the double input vacuum tube type described on pages 640 and 641 of the volume entitled "Waveforms" to which reference has been previously made. The output signal 19 is fed to the screen grid of amplifier 11. Clamp circuits 31, 33, and 35 are provided, in a manner well known to those skilled in the art, to insure constant black level with changes in picture content.

What I claim is:

1. A wave shaping circuit comprising a source of signals, a first electrical circuit connected to said source of signals, means to control the steady state signal amplitude transfer characteristic of said first electrical circuit, a utilization circuit connected to said first electrical circuit and having a non-linear characteristic, a second electrical circuit having a non-linear steady state signal amplitude transfer characteristic, means connecting said second electrical circuit to said first electrical circuit, an adder circuit connected to said second electrical circuit, means connecting said source of signals to said adder circuit, and means connecting said adder circuit to said means to control the steady state signal amplitude transfer characteristics of said first electrical circuit.

2. In a wave shaping circuit designed to compensate for the non-linearity of the steady state signal amplitude transfer characteristic of an electrical arrangement, said wave shaping circuit comprising a source of signals and a first electrical circuit connected to said source of signals, means to control the steady state signal amplitude transfer characteristic of said first electrical circuit, a second electrical circuit having a steady state signal amplitude transfer characteristic similar to the steady state signal amplitude transfer characteristic of said electrical arrangement, means connecting said second electrical circuit to said first electrical circuit, an adder circuit connected to said second electrical circuit, means connecting said source of signals to said adder circuit, and means connecting said adder circuit to said steady state signal amplitude transfer characteristic control means.

3. In a wave shaping circuit designed to compensate for non-linearity of the steady state signal amplitude transfer characteristic of an electrical arrangement, said wave shaping circuit comprising a source of signals and a first electrical circuit connected to said source of signals, means to control the steady state signal amplitude transfer characteristic of said first electrical circuit and comprising: a second electrical circuit connected to said first electrical circuit and having a steady state signal amplitude transfer characteristic similar to the steady state signal amplitude transfer characteristic of said electrical arrangement, means arranged to obtain a control potential representing the instantaneous difference between the output signal of said source of signals and the output signal of said second electrical circuit when both said output signals are in phase, and means to apply said control potential to said first electrical circuit so as to control the steady state signal amplitude transfer characteristic of said first electrical circuit in accordance with said control potential.

4. In a wave shaping circuit designed to compensate for the non-linearity of the steady state signal amplitude transfer characteristic of an electrical arrangement, said wave shaping circuit comprising a source of signals, an amplifier having a first and a second input electrode and an output electrode, means adapted to connect a utilization circuit to said output electrode, and means connecting the first input electrode of said amplifier to said source of signals, means to control the steady state signal amplitude transfer characteristic of said first electrical circuit and comprising: a second electrical circuit connected to the output electrode of said amplifier and having a steady state signal amplitude transfer characteristic similar to the steady state signal amplitude transfer characteristic of said electrical arrangement, means arranged to obtain a control potential representing the instantaneous difference between the output signal of said source of signals and the output signal of said second electrical circuit when both said output signals are in phase, and means to apply said control potential to the second input electrode of said amplifier so as to control the steady state signal amplitude transfer characteristic of said amplifier in accordance with said control potential.

5. In a wave shaping circuit designed to compensate for the non-linearity of the beam current versus grid voltage characteristic of a kinescope, said wave shaping circuit comprising a source of signals, a first electrical circuit connected to said source of signals, and means to connect a utilization circuit to said first electrical circuit, means to control the steady state signal amplitude transfer characteristic of said first electrical circuit and comprising: a second electrical circuit connected to said first electrical circuit and including a vacuum tube having a plate current versus grid voltage characteristic similar to the beam current versus grid voltage characteristic of said kinescope, means arranged to obtain a control potential representing the instantaneous difference between the output signal of said source of signals and the output signal of said second electrical circuit when both said output signals are in phase, and means to apply said control potential to said first electrical circuit so as to control the steady state signal amplitude transfer characteristic of said first electrical circuit in accordance with said control potential.

References Cited in the file of this patent

UNITED STATES PATENTS

| | | |
|---|---|---|
| 2,251,973 | Beale et al. | Aug. 12, 1941 |
| 2,324,797 | Norton | July 20, 1943 |
| 2,406,433 | Norton | Aug. 27, 1946 |
| 2,451,950 | Hipple, Jr. | Oct. 19, 1948 |
| 2,506,770 | Braden | May 9, 1950 |
| 2,538,028 | Mozley | Jan. 16, 1951 |
| 2,587,313 | Grundmann | Feb. 26, 1952 |